(12) United States Patent
He et al.

(10) Patent No.: US 7,776,237 B2
(45) Date of Patent: Aug. 17, 2010

(54) POLYMER DISPERSION WITH A COLOUR EFFECT

(75) Inventors: Xu He, Ludwigshafen (DE); Reinhold J. Leyrer, Dannstadt (DE); Holger Schöpke, Neckargemünd (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1227 days.

(21) Appl. No.: 10/553,793

(22) PCT Filed: May 4, 2004

(86) PCT No.: PCT/EP2004/004707

§ 371 (c)(1),
(2), (4) Date: Oct. 18, 2005

(87) PCT Pub. No.: WO2004/098793

PCT Pub. Date: Nov. 18, 2004

(65) Prior Publication Data

US 2006/0191442 A1    Aug. 31, 2006

(30) Foreign Application Priority Data

May 9, 2003    (DE) ................................ 103 21 083

(51) Int. Cl.
| | | |
|---|---|---|
| *B05D 5/06* | (2006.01) | |
| *C09D 5/36* | (2006.01) | |
| *C09D 7/14* | (2006.01) | |
| *C09D 5/02* | (2006.01) | |
| *C09D 151/10* | (2006.01) | |
| *C08F 2/22* | (2006.01) | |
| *C08F 265/00* | (2006.01) | |

(52) U.S. Cl. .................. 264/1.34; 264/1.1; 264/21; 264/349; 53/401; 427/180; 427/445; 524/458; 525/902; 526/201

(58) Field of Classification Search ................ 524/458; 525/902; 526/201; 264/1.1, 21, 1.34, 349; 53/401; 427/180, 445
See application file for complete search history.

(56) References Cited

U.S. PATENT DOCUMENTS

| | | | |
|---|---|---|---|
| 5,157,084 A | | 10/1992 | Lee et al. |
| 5,229,209 A | * | 7/1993 | Gharapetian et al. ........ 428/403 |
| 5,273,824 A | * | 12/1993 | Hoshino et al. ......... 428/402.24 |
| 2002/0072560 A1 | * | 6/2002 | Bardman et al. ............. 524/501 |

FOREIGN PATENT DOCUMENTS

| | | |
|---|---|---|
| DE | 197 17 879 | 10/1998 |
| DE | 198 20 302 | 2/2000 |
| DE | 198 34 194 | 2/2000 |
| DE | 102 29 732 | 1/2004 |
| EP | 0 441 559 | 8/1991 |
| EP | 0 451 940 | 10/1991 |
| EP | 1 197 503 | 4/2002 |

* cited by examiner

*Primary Examiner*—Kelechi C Egwim
(74) *Attorney, Agent, or Firm*—Oblon, Spivak, McClelland, Maier & Neustadt, L.L.P.

(57) ABSTRACT

Process for improving the brilliance of color and the stability of a colored polymer system, which is composed of a matrix and of discrete polymer particles distributed in accordance with a defined spatial lattice structure in the matrix, and which is obtained by filming of an emulsion polymer with core/shell structure, which comprises using an emulsion polymer obtainable by
polymerizing monomers in at least one first stage (core monomers),
then polymerizing monomers in at least one further, second stage (transition stage), and
finally polymerizing monomers in a third stage (shell monomers), where, based on the percentage constitution of the monomer mixtures of the three stages, at most 30% by weight of the monomers of the first stage are identical with those of the third stage, and 5% of the monomers of the second stage are identical with, respectively, those of the first and those of the third stage, and not more than 60% by weight of the monomers of the $2^{nd}$ stage here are monomers absent in the $1^{st}$ stage and also absent in the $3^{rd}$ stage.

31 Claims, No Drawings

POLYMER DISPERSION WITH A COLOUR EFFECT

The invention relates to a process for improving the brilliance of color and the stability of a colored polymer system, which is composed of a matrix and of discrete polymer particles distributed in accordance with a defined spatial lattice structure in the matrix, and which is obtained by filming of an emulsion polymer with core/shell structure, which comprises
using an emulsion polymer obtainable by
polymerizing monomers in at least one first stage (core monomers),
then polymerizing monomers in at least one further, second stage (transition stage), and
finally polymerizing monomers in a third stage (shell monomers), where, based on the percentage constitution of the monomer mixtures of the three stages, at most 30% by weight of the monomers of the first stage are identical with those of the third stage, and 5% of the monomers of the second stage are identical with, respectively, those of the first and those of the third stage, and not more than 60% by weight of the monomers of the $2^{nd}$ stage here are monomers absent in the $1^{st}$ stage and also absent in the $3^{rd}$ stage.

The invention further relates to colored polymer systems which are obtainable by this process, and to the use of the colored polymer systems for the coating of, by way of example, plastics or paper, or in visual displays.

DE-19717879, DE-19820302 and DE-19834194 have disclosed colored polymer systems in which discrete polymer particles have been dispersed in a matrix.

DE 10229732 describes the use of polymer layers of this type in elements of visual displays.

It is an object of the present invention to improve the brilliance of color and the stability of the colored polymer systems.

We have found that this object is achieved by way of the process described at the outset.

The colored polymer systems are substantially composed of a matrix and of discrete polymer particles, which have been distributed in accordance with a defined spatial lattice structure in the matrix.

The Polymer Particles

In order to develop a defined spatial lattice structure, the intention is that the discrete polymer particles have maximum size uniformity. A measure of the uniformity of the polymer particles is what is known as the polydispersity index, calculated from the formula $$PI=(D_{90}-D_{10})/D_{50}$$

where $D_{90}$, $D_{10}$, and $D_{50}$ are particle diameters for which the following apply:

$D_{90}$: 90% by weight of the total weight of all of the particles have a particle diameter smaller than or equal to $D_{90}$
$D_{50}$: 50% by weight of the total weight of all of the particles have a particle diameter smaller than or equal to $D_{50}$
$D_{10}$: 10% by weight of the total weight of all of the particles have a particle diameter smaller than or equal to $D_{10}$ Further explanations concerning the polydispersity index are found, by way of example, in DE-A 19717879 (in particular drawings on page 1).

The particle size distribution may be determined in the known manner, by way of example using an analytical ultracentrifuge (W. Mächtle, Makromolekulare Chemie 185 (1984) pages 1025-1039), and from this the $D_{10}$, $D_{50}$, and $D_{90}$ values can be derived, and the polydispersity index determined (this being the method used to determine the values in the examples).

As an alternative, the particle size and particle size distribution may also be determined by measuring light-scattering, using commercially available equipment (e.g. Autosizer 2C from Malvern, England).

The polymer particles preferably have a $D_{50}$ value in the range from 0.05 to 5 µm. The polymer particles may comprise one type of particle or two or more types of particle with different $D_{50}$ value, and each type of particle here preferably has a polydispersity index smaller than 0.6, particularly preferably smaller than 0.4, and very particularly preferably smaller than 0.3, and in particular smaller than 0.15.

The polymer particles are in particular composed only of a single type of particle. The $D_{50}$ value is then preferably from 0.05 to 20 µm, particularly preferably from 100 to 400 nanometers.

In the inventive process, the colored polymer system is obtained by filming of an emulsion polymer with core/shell structure.

The shell of the emulsion polymer is filmable and forms the matrix, while the cores of the emulsion polymer has been distributed as discrete polymer particles in the matrix.

The statements above relating to the particle size and particle size distribution of the discrete polymer particles also apply to the emulsion polymer itself.

The use of emulsion polymers with core/shell structure for preparing colored polymer systems has been previously described in the prior art (see DE-A-19820302, DE-A-19834194).

In contrast, a novel feature of the inventive process is that a transition stage is formed between the core and the shell.

Accordingly, the emulsion polymer used according to the invention is obtained by multistage polymerization, where
the monomers which form the core are first polymerized in at least one $1^{st}$ stage,
then the monomers in at least one $2^{nd}$ stage (transition stage) are polymerized, and finally, in a $3^{rd}$ stage, the monomers which form the filmable shell are polymerized.

The core and the shell naturally differ markedly in monomer constitution. The core has preferably been crosslinked, whereas the shell has not been crosslinked. Monomers with a high glass transition temperature ($T_g$) are preferably used in the core, whereas the monomers of the shell have a lower $T_g$.

Based in each case on the percentage constituent of the $1^{st}$ and $3^{rd}$ stage, not more than 30% by weight of the monomers of the $1^{st}$ stage are identical with those of the $3^{rd}$ stage; it is preferable that not more than 15% by weight, and particularly preferable that not more than 5% by weight, and very particularly preferable that none, of the monomers of the $1^{st}$ and $3^{rd}$ stage are identical.

EXAMPLE

By way of example, the $1^{st}$ stage is intended to be composed of 80% by weight of styrene, 10% by weight of butyl acrylate, 5% by weight of butanediol diacrylate, and 5% by weight of acrylic acid; the $3^{rd}$ stage of 90% by weight of butyl acrylate, 5% by weight of styrene, and 5% by weight of acrylic acid.

5% by weight of acrylic acid, 10% by weight of butyl acrylate, and 5% by weight of styrene are present both in the $1^{st}$ and in the $3^{rd}$ stage. 20% by weight of the entirety of the monomers are identical.

After the polymerization of the monomers of the 1$^{st}$ stage and prior to the polymerization of the monomers of the 3$^{rd}$ stage, the monomers of the 2$^{nd}$ stage (transition stage) are polymerized.

The following applies to the monomer mixture of the 2$^{nd}$ stage:

At least 5% by weight of the monomers of the 2$^{nd}$ stage are identical with those of the 1$^{st}$ stage and at least 5% by weight of the monomers of the 2$^{nd}$ stage are identical with those of the 3$^{rd}$ stage.

In each case it is preferable that at least 10% by weight, particularly preferable that at least 20% by weight, and very particularly preferable that at least 30% by weight, in particular at least 40% by weight, of the monomers of the 2$^{nd}$ stage are identical with those of the 1$^{st}$ stage and, respectively, of the 3$^{rd}$ stage.

The total amount of the monomers of the 2$^{nd}$ stage which are monomers absent in the 1$^{st}$ stage and also absent in the 3$^{rd}$ stage is at most 60% by weight, preferably at most 40% by weight, particularly preferably at most 20% by weight, very particularly preferably at most 5% by weight, in particular 0% by weight.

EXAMPLE

| 1$^{st}$ stage | 2$^{nd}$ stage | 3$^{rd}$ stage |
|---|---|---|
| 80% by weight of styrene | 40% by weight of styrene | 90% by weight of butyl acrylate |
| 10% by weight of butyl acrylate | 55% by weight of butyl acrylate | 5% by weight of styrene |
| 5% by weight of acrylic acid | 4% by weight of acrylic acid | 5% by weight of acrylic acid |
| 5% by weight of butanediol diacrylate | 1% by weight of methacrylic acid | |

In the present example, 54% by weight of the monomers of the 2$^{nd}$ stage are identical with those of the 1$^{st}$ stage (specifically 40% of styrene, 10% of butyl acrylate, and 4% of acrylic acid from the 2$^{nd}$ stage).

Furthermore, 64% by weight of the monomers of the 2$^{nd}$ stage of are identical with those of the 3$^{rd}$ stage (55% by weight of butyl acrylate, 5% by weight of styrene, and 4% by weight of acrylic acid).

A total of 99% by weight of the monomers of the 2$^{nd}$ stage are present in the 1$^{st}$ or 3$^{rd}$ stage, and only 1% by weight (methacrylic acid) is absent in the 1$^{st}$ and also in the 3$^{rd}$ stage.

The monomers of the 1$^{st}$ stage preferably comprise crosslinking monomers, in particular monomers having two polymerizable groups, e.g. divinylbenzene or alkanediol diacrylates.

The proportion of the crosslinking monomers in the monomer mixture of the 1$^{st}$ stage is preferably from 0.01 to 10% by weight, preferably from 0.1 to 5% by weight, based on the monomers of the 1$^{st}$ stage.

The monomer mixture of the 1$^{st}$ stage preferably has a glass transition temperature ($T_g$), calculated by the Fox equation, of from 15 to 150° C., particularly preferably from 25 to 120° C.

The monomer mixture of the 3$^{rd}$ stage is filmable and preferably comprises no crosslinking agents.

The $T_g$ of the monomer mixture of the 3$^{rd}$ stage, calculated by the Fox equation, is preferably from −50 to 110° C., particularly preferably from −40 to 25° C. The $T_g$ of the monomer mixture of the 3$^{rd}$ stage is preferably lower than the $T_g$ of the monomer mixture of the 1$^{st}$ stage by at least 10° C., particularly preferably by at least 20° C.

The ratio by weight of the monomers which form the non-filming core to the monomers which form the filming shell is preferably from 1:0.05 to 1:20, particularly preferably from 1:0.2 to 1:5. The monomers of the transition stage are counted here as part of the core if they are non-filming, e.g. due to content of crosslinking monomers, and counted as part of the shell if they film.

It is preferable that the 2$^{nd}$ stage has been crosslinked, therefore forming, together with the 1$^{st}$ stage, the discrete polymer particles in the matrix.

The proportion of the monomers of the transition stage is preferably from 2 to 40% by weight, based on all of the monomers of the emulsion polymer.

The preferred total proportion of the stages, based on the entire polymer, is as follows:

1$^{st}$ stage (core) from 10 to 90% by weight, particularly preferably from 40 to 60% by weight.

2$^{nd}$ stage (transition stage) from 2 to 40% by weight, particularly preferably from 5 to 15% by weight.

3$^{rd}$ stage (shell) from 8 to 88% by weight, particularly preferably from 30 to 50% by weight.

The entire emulsion polymer is preferably composed of at least 40% by weight, with preference at least 60% by weight, particularly preferably at least 80% by weight, of what are known as main monomers.

The main monomers have been selected from $C_1$-$C_{20}$-alkyl (meth)acrylates, vinyl esters of carboxylic acids which contain up to 20 carbon atoms, vinylaromatics having up to 20 carbon atoms, ethylenically unsaturated nitriles, vinyl halides, vinyl ethers of alcohols which contain from 1 to 10 carbon atoms, aliphatic hydrocarbons having from 2 to 8 carbon atoms and one or two double bonds, or mixtures of these monomers.

By way of example, mention may be made of alkyl (meth)acrylates having a $C_1$-$C_{10}$-alkyl radical, for example methyl methacrylate, methyl acrylate, n-butyl acrylate, ethyl acrylate, and 2-ethylhexyl acrylate.

Mixtures of the alkyl (meth)acrylates are also particularly suitable.

Examples of vinylesters of carboxylic acids which have from 1 to 20 carbon atoms are vinyl laurate, vinyl stearate, vinyl propionate, vinyl versatate, and vinyl acetate.

Vinylaromatic compounds which may be used are vinyltoluene, α- and p-methylstyrene, alpha-butylstyrene, 4-n-butylstyrene, 4-n-decylstyrene, and preferably styrene. Examples of nitriles are acrylonitrile and methacrylonitrile.

The vinyl halides are chlorine-, fluorine-, or bromine-substituted ethylenically unsaturated compounds, preferably vinyl chloride and vinylidene chloride.

By way of example of vinyl ethers, mention may be made of vinyl methyl ether or vinyl isobutyl ether. Preference is given to vinyl ethers of alcohols which contain from 1 to 4 carbon atoms.

Of hydrocarbons having from 2 to 8 carbon atoms and one or two olefinic double bonds, mention may be made of butadiene, isoprene, and chloroprene, and by way of example of those having one double bond mention may be made of ethylene or propylene.

Preferred main monomers are the $C_1$-$C_{20}$-alkyl acrylates and $C_1$-$C_{20}$-alkyl methacrylates, in particular $C_1$-$C_8$-alkyl acrylates and $C_1$-$C_8$-alkyl methacrylates, vinylaromatics, in particular styrene, and mixtures of these, and also in particular mixtures of the alkyl (meth)acrylates and vinylaromatics.

Very particular preference is given to methyl acrylate, methyl methacrylate, ethyl acrylate, n-butyl acrylate, n-hexyl acrylate, octyl acrylate, and 2-ethylhexyl acrylate, and styrene, and also mixtures of these monomers.

The emulsion polymer is prepared by emulsion polymerization. The emulsion polymerization method uses ionic and/or non-ionic emulsifiers and/or protective colloids, or stabilizers as surface-active compounds.

A detailed description of suitable protective colloids is found in Houben-Weyl, Methoden der organischen Chemie, volume XIV/1, Makromolekulare Stoffe, Georg-Thieme-Verlag, Stuttgart, 1961, pp. 411-420. Emulsifiers which may be used are either anionic, cationic or non-ionic emulsifiers. The surface-active substances preferably comprise emulsifiers whose molecular weight is usually below 2000 g/mol, in contrast to that of protective colloids.

The amounts usually used of the surface-active substance are from 0.1 to 10% by weight, based on the monomers to be polymerized.

Examples of water-soluble initiators for the emulsion polymerization are the ammonium and alkali metal salts of peroxydisulfuric acid, e.g. sodium peroxodisulfate, hydrogen peroxide, or organic peroxides, e.g. tert-butyl hydroperoxide.

The systems known as reduction-oxidation (redox) initiator systems are also suitable.

Redox initiator systems are composed of at least one, mostly inorganic, reducing agent, and of an inorganic or organic oxidant.

The abovementioned initiators for the emulsion polymerization are examples of the oxidation component.

Examples of the reduction components are alkali metal salts of sulfurous acid, e.g. sodium sulfite, sodium hydrogensulfite, alkali metal salts of disulfurous acid, such as sodium disulfite, bisulfite addition compounds of aliphatic aldehydes and ketones, such as acetone bisulfite, or reducing agents such as hydroxymethanesulfinic acid and its salts, or ascorbic acid. When the redox initiator systems are used, concomitant use may be made of soluble metal compounds whose metallic component can occur in more than one valence state.

Examples of conventional redox initiator systems are ascorbic acid/ferrous sulfate/sodium peroxodisulfate, tert-butyl hydroperoxide/sodium disulfite, tert-butyl hydroperoxide/Na hydroxymethanesulfinic acid. The individual components, e.g. the reduction component, may also be mixtures, e.g. a mixture of the sodium salt of hydroxymethanesulfinic acid and sodium disulfite.

The amount of the initiators is generally from 0.1 to 10% by weight, preferably from 0.5 to 5% by weight, based on the monomers to be polymerized. It is also possible to use two or more different initiators in the emulsion polymerization.

The emulsion polymerization generally takes place from 30 to 130° C., preferably from 50 to 90° C. The polymerization medium may be composed either entirely of water or else of mixtures of water and liquids miscible therewith, for example methanol. It is preferable to use only water. The emulsion polymerization may be carried out either as a batch process or else as a feed process, which includes a staged or gradient method. Preference is given to the feed process, in which some of the polymerization mixture forms an initial charge and is heated to the polymerization temperature and begins to polymerize, and then the remainder of the polymerization mixture is introduced to the polymerization zone continuously, in stages, or as required by a concentration gradient, usually via two or more spatially separated feeds, of which one or more comprise(s) the monomers in pure or emulsified form, so as to maintain progress of the polymerization. A polymer seed may also form an initial charge in the polymerization for better particle-size control, for example.

Before the addition of the monomers of the next stage is begun, the polymerization of the monomers of the monomer mixture of the $1^{st}$ or $2^{nd}$ stage is preferably at least 90% by weight complete, particularly preferably at least 95% by weight complete, and very particularly preferably at least 99% by weight complete.

The average skilled worker is aware of the manner in which the initiator is added to the polymerization vessel during the course of the free-radical aqueous emulsion polymerization. All of the initiator may form an initial charge in the polymerization vessel, or else it may be used in a continuous or staged manner as required by its consumption in the course of the free-radical aqueous emulsion polymerization. The detail here depends on the chemical nature of the initiator system and also on the polymerization temperature. It is preferable for a portion to form an initial charge and for the remainder to be introduced to the polymerization zone as required by consumption.

Uniform particle size, i.e. low polydispersity index, is obtainable via the methods known to the skilled worker, e.g. by varying the amount of the surface-active compound (emulsifier or protective colloids) and/or appropriate stirrer speeds.

Initiator is also usually added after the end of the actual emulsion polymerization, i.e. after at least 95% conversion of the monomers, in order to remove the residual monomers.

The individual components may be added to the reactor during the feed process from above, at the side, or from below through the floor of the reactor.

The emulsion polymer may be filmed in the usual way with removal of the water, thereby forming the colored polymer system.

The polymer system produces a visual effect, i.e. an observable reflection, through interference generated by the light scattered at the polymer particles.

The wavelength of this reflection can be anywhere in the electromagnetic spectrum, depending on the distance between the polymer particles. The wavelength is preferably in the UV region, IR region, and in particular in the visible light region.

The wavelength of this observable reflection depends, in accordance with the known Bragg equation, on the distance between the lattice planes, in this case the distance between the polymer particles arranged in a spatial lattice structure in the matrix.

The proportion by weight of the matrix has in particular to be selected appropriately in order to establish the desired spatial lattice structure with the desired distance between the polymer particles. In the preparation methods described above, the appropriate amount of the organic compounds, e.g. polymeric compounds, should be used.

The proportion by weight of the matrix, i.e. the proportion of the filming shell, is in particular judged so that the spatial lattice structure produced and comprising the polymer particles reflects electromagnetic radiation in the desired region.

The distance between the polymer particles (in each case measured to the center of the particles) is suitably from 100 to 400 nm if a color effect, i.e. a reflection in the visible light region, is desired.

A transparent polymer layer may be applied to the colored polymer system in order to improve the brilliance of color and the stability of the colored polymer system.

The polymer which forms the transparent layer may be any desired polymer. Use may be made of polycondensates, polyadducts, or polymers obtainable from compounds (monomers) capable of free-radical polymerization. The latter are preferred.

The entirety of the polymer of the transparent layer is composed of at least 40% by weight, preferably at least 60% by weight, of what are known as main monomers, selected from $C_1$-$C_{20}$-alkyl (meth)acrylates, vinylesters of carboxylic acids which contain up to 20 carbon atoms, vinylaromatics having up to 20 carbon atoms, ethylenically unsaturated nitriles, vinyl halides, vinyl ethers of alcohols which contain from 1 to 10 carbon atoms, aliphatic hydrocarbons having from 2 to 8 carbon atoms and one or two double bonds, or mixtures of these monomers.

The polymer of the transparent polymer layer is particularly preferably an emulsion polymer.

The preparation of the emulsion polymers has been described above.

The ponderal median particle diameter in the aqueous polymer dispersion obtained by emulsion polymerization is preferably from 10 to 200 nm, preferably from 10 to 50 nm.

To prepare the transparent polymer layer, the polymer, preferably in the form of a dispersion or solution, is applied to the colored polymer system, which is generally in the form of a colored coating or in the form of a molding.

In the case of a dispersion or solution, a drying process takes place, where appropriate also at an elevated temperature.

The resultant transparent polymer layer preferably has a thickness of from 0.2 to 500 μm, preferably from 2 to 100 μm. The transparent polymer layer improves the brilliance of color and the stability of the color effects.

A further improvement is achieved by heating the colored polymer system and, where appropriate, the applied transparent polymer layer, to temperatures above 50° C.

This temperature should in particular be higher than the glass transition temperature of the matrix. The temperature is preferably above 100° C. It does not generally exceed 200° C. The heating period is preferably at least 5 seconds and at most 5 minutes.

The colored polymer systems obtainable or obtained by the inventive process have improved brilliance of color and stability.

EXAMPLES OF APPLICATION OF THE PATENT

All of the syntheses were carried out in a 2000 ml four-necked flask which had been equipped with a reflux condenser, a nitrogen inlet tube, inlet tubes for the supply of the monomer emulsion and of the initiator solution, and have an anchor stirrer with a rotation rate of 150 rpm.

Example 1

Synthesis of a Core Particle Dispersion (1$^{st}$ Stage)

258.6 g of water were first used to form an initial charge in a reactor with anchor stirrer, thermometer, gas inlet tube, feed tubes, and reflux condenser, and 5.08 g of polystyrene seed particle dispersion with a particle size of 30 nm and a solids content of 33% by weight were then added. The contents of the flask were then heated and stirred at a rotation rate of 150 rpm. During this period, nitrogen was introduced into the reactor. Once a temperature of 85° C. had been achieved in the heating bath and a temperature of 80° C. had been achieved in the reactor, the nitrogen supply was stopped, and air was prevented from entering the reactor. Prior to the polymerization, 19.3% of a sodium persulfate solution composed of 3.6 g of sodium persulfate in 100 g of water were introduced into the reactor and the mixture was pre-oxidized for 5 minutes, and then the remainder of the sodium persulfate solution was added within a period of 4 hours. During these 4 hours, 8.6% by weight of monomer emulsion (a), Texapon NSO (conc.: 28% by weight), 5.22 g, and 35.0 g of n-butyl acrylate were added within a period of 40 minutes. The remainder of the monomer emulsion (a) was then added over a period of 3 hours and 20 minutes. It was assumed that the reaction proceeded under deficit conditions, thus avoiding any formation of secondary seeds. Once monomer addition has been concluded, the dispersion is allowed to post-polymer for one hour. Cooling to room temperature followed.

| Monomer emulsion | |
|---|---|
| 540.0 g | of styrene |
| 13.33 g | of divinylbenzene |
| 1.67 g | of allyl methacrylate |
| 10.0 g | of acrylic acid |
| 16.39 g | of Texapon, conc. by weight: 28% |
| 22.11 g | of sodium hydroxide solution, conc. by weight: 25% |
| 501.3 g | of water |

The dispersion has the following properties:

| | |
|---|---|
| Solids content: | 40% by weight |
| Particle size: | 206.3 nm |
| Coagulation: | <1.5 g |
| pH: | 6.59 |
| Polydispersity index: | 0.14 |

Core particles of different sizes can be obtained by changing the seed particle concentrations. Table 1 shows different particles.

TABLE 1

| | Example No. | | | | | |
|---|---|---|---|---|---|---|
| | 1A | 1B | 1C | 1D | 1E | 1F |
| Seed conc. % | 0.65 | 0.55 | 0.44 | 0.275 | 0.2 | 0.17 |
| Solids content | 35.0 | 35.4 | 40.2 | 39.9 | 30.0 | 34.8 |
| Particle size (nm) | 149.1 | 161.5 | 170.6 | 206.3 | 208.6 | 254.8 |
| PI | 0.13 | 0.16 | 0.17 | 0.14 | 0.26 | 0.14 |

Example 2

Synthesis of a Core/Shell Particle Dispersion 325.8 g of dispersion as in Example 1 D form an initial charge in a reactor with anchor stirrer, thermometer, gas inlet tube, feed tubes, and reflux condenser. The heating process was then begun, as was stirring at a rotation rate of 150 rpm. During this period, nitrogen was introduced into the reactor. Once a temperature of 85° C. had been reached in the heating bath and 80° C. had been reached in the reactor, the nitrogen feed was stopped and air was prevented from entering the reactor. 9.8% of a sodium persulfate solution composed of 0.8 g of sodium persulfate in 50 g of water (initiator solution) were added prior to the polymerization. After 5 minutes, the remainder of the sodium persulfate solution was added within a period of 3 hours. During the same 3 hours, the monomer emulsion (a) was added within a period of 45 minutes, and the mixture was then allowed to post-polymerize for 15 minutes. The monomer emulsion (b) was then added within a period of 2 hours, and, after a further hour of post-polymerization, the mixture was cooled to room temperature.

| Monomer emulsion (2$^{nd}$ stage) | |
|---|---|
| 11.7 g | of styrene |
| 9.1 g | of n-butyl acrylate |
| 1.17 g | of allyl methacrylate |
| 1.46 g | of acrylic acid |
| 1.86 g | of Texapon, conc. by weight: 28% |
| 1.46 g | of sodium hydroxide solution, conc. by weight: 25% |
| 55.0 g | of water |

| Monomer emulsion (3$^{rd}$ stage) | |
|---|---|
| 71.5 g | of n-butyl acrylate |
| 34.6 g | of methyl methacrylate |
| 1.3 g | of acrylic acid |
| 1.16 g | of Texapon, conc. by weight: 28% |
| 0.77 g | of sodium hydroxide solution, conc. by weight: 25% |
| 53.5 g | of water |

The dispersion has the following properties:

| | |
|---|---|
| Core: envelope ratio by weight: | 1:1 |
| Solids content: | 40% by weight |
| Particle size: | 279.8 nm |
| Coagulation: | <2 g |
| pH: | 5.66 |
| Polydispersity index: | 0.15 |

It is possible to prepare core/shell particles with a core:envelope ratio of 1:1. Table 2 shows the properties of core/shell particles and of the films produced from the dispersions. In Table 2, film color (p) is the film color when observed in a direction perpendicular to the film surface; film color (o) is the film color when observed in a direction oblique to the film surface.

TABLE 2

| | Example No. | | | | | |
|---|---|---|---|---|---|---|
| | 2A | 2B | 2C | 2D | 2E | 2F |
| Core number | 1A | 1B | 1C | 1D | 1E | 1F |
| Solids content | 40.2 | 40.3 | 40.2 | 40.8 | 40.0 | 39.9 |
| Particle size (nm) | 234.2 | 224.0 | 233.7 | 279.8 | 364.7 | 332.6 |
| PI | 0.19 | 0.17 | 0.16 | 0.15 | 0.26 | 0.13 |
| Film color (p) | very dark violet | violet | blue | green | orange | red |
| Film color (o) | black | very dark violet | very dark blue | pale blue | bluish green | green |

Example 3

Synthesis of a Core Particle Ddispersion 206.3 g of water were used to form an initial charge in a reactor with anchor stirrer, thermometer, gas inlet tube, feed tubes, and reflux condenser, and 2.73 g of polystyrene seed particle dispersion with a particle size of 30 nm and a solids content of 33% by weight were then added. The heating and stirring process was then started, the rotation rate being 150 min$^{-1}$. During this period, nitrogen was introduced into the reactor. Once a temperature of 85° C. had been achieved in the heating bath and 80° C. had been achieved in the reactor, the nitrogen feed was stopped and air was prevented from entering the reactor. Prior to the polymerization, 2.4% by weight of a sodium persulfate solution composed of 2.7 g of sodium persulfate in 187.0 g of water were added to the reactor, and after 5 minutes the remainder of the sodium persulfate solution was added over a period of 4 hours. During these 4 hours, 8.6% by weight of the monomer emulsion (a) and 30.0 g of n-butyl acrylate were added within a period of 40 minutes; the remainder of the monomer emulsion (a) was then added over a period of 3 hours and 20 minutes. It was assumed that the reaction proceeded under deficit conditions, thus avoiding formation of any secondary seed. Once monomer addition had been concluded, the dispersion was permitted to post-polymerize for one hour and to cool to room temperature.

| Monomer emulsion | |
|---|---|
| 405.0 g | of styrene |
| 11.25 g | of divinylbenzene |
| 3.75 g | of acrylic acid |
| 9.643 g | of Texapon, conc. by weight: 28% |
| 10.0 g | of sodium hydroxide solution, conc. by weight: 25% |
| 650.0 g | of water |

The dispersion has the following properties:

| | |
|---|---|
| Solids content: | 30% by weight |
| Particle size: | 244.5 nm |
| Coagulation: | <1.5 g |
| pH: | 7.2 |
| Polydispersity index: | 0.14 |

Core particles of different sizes can be prepared by changing the concentrations of seed particles. Table 3 shows different particles.

TABLE 3

| | Example number | | |
|---|---|---|---|
| | 3A | 3B | 3C |
| Seed conc., % by weight | 0.42 | 0.275 | 0.2 |
| Solids content | 34.9 | 39.9 | 30.0 |
| Particle size (nm) | 166.5 | 264.1 | 246.5 |
| PI | 0.20 | 0.20 | 0.14 |

Example 4

Synthesis of a Core/Shell Particle Dispersion 376.3 g of dispersion as in Example 3C form an initial charge in a reactor with anchor stirrer, thermometer, gas inlet tube, feed tubes, and reflux condenser. 24 g of water were added, and the heating process was then begun, as was stirring at a rotation rate of 150 rpm. During this period, nitrogen was introduced into the reactor. Once a temperature of 85° C. had been reached in the heating bath and 80° C. had been reached in the reactor, the nitrogen feed was stopped and air was prevented from entering the reactor. 5% of a sodium persulfate solution composed of 2.25 g of sodium persulfate in 153.8 g of water (initiator solution) was added prior to the polymerization, and the mixture was pre-oxidized for 5 minutes. The remainder of the sodium persulfate solution was then added within a period of 2 hours. During these 2 hours, the monomer emulsion (a) was added, and after one hour of post-polymerization the mixture was then cooled to room temperature.

| Monomer emulsion | |
|---|---|
| 221.3 g | of n-butyl acrylate |
| 146.3 g | of methyl methacrylate |
| 7.5 g | of acrylic acid |
| 5.8 g | of Texapon, conc. by weight: 28% |
| 17.5 g | of sodium hydroxide solution, conc. by weight: 25% |
| 268.8 g | of water |

The dispersion has the following properties:

| | |
|---|---|
| Core: envelope ratio by weight: | 1:3 |
| Solids content: | 40% by weight |
| Particle size: | 390.4 nm |
| Coagulation: | <1.5 g |
| pH: | 7.14 |
| Polydispersity index: | 0.11 |

Example 5

Synthesis of a Core/Shell Dispersion 444.7 g of dispersion as in Example 3A form an initial charge in a reactor with anchor stirrer, thermometer, gas inlet tube, feed tubes, and reflux condenser. The heating process was then begun, as was stirring at a rotation rate of 150 rpm. During this period, nitrogen was introduced into the reactor. Once a temperature of 85° C. had been reached in the heating bath and 80° C. had been reached in the reactor, the nitrogen feed was stopped and air was prevented from entering the reactor. 2.8% of a sodium persulfate solution composed of 1.38 g of sodium persulfate in 95.8 g of water (initiator solution) were added prior to the polymerization. After 5 minutes, the remainder of the sodium persulfate solution was added within a period of 3 hours. During the same 3 hours, the monomer emulsion (a) was added within a period of 45 minutes, and the mixture was then allowed to post-polymerize for 15 minutes. Mixture (b) was then added within a period of 2 hours, and, after one hour of post-polymerization, the mixture was cooled to room temperature.

| Monomer emulsion | |
|---|---|
| 20.7 g | of styrene |
| 16.1 g | of n-butyl acrylate |
| 1.15 g | of acrylic acid |
| 3.36 g | of Texapon, conc. by weight: 28% |
| 2.6 g | of sodium hydroxide solution, conc. by weight: 25% |
| 91.1 g | of water |

| Monomer emulsion | |
|---|---|
| 189.8 g | of n-butyl acrylate |
| 2.3 g | of acrylic acid |
| 2.1 g | of Texapon, conc. by weight: 28% |
| 4.6 g | of sodium hydroxide solution, conc. by weight: 25% |
| 74.5 g | of water |

The dispersion has the following properties:

| | |
|---|---|
| Core: envelope ratio by weight: | 1:1.5 |
| Solids content: | 39.8% by weight |
| Particle size: | 233.5 nm |
| Coagulation: | <1.5 g |
| pH: | 7.30 |
| Polydispersity index: | 0.24 |

Example 6

Synthesis of an Overlayer Dispersion

A reactor with anchor stirrer, thermometer, gas inlet tube, feed tubes, and reflux condenser was heated to 50° C. and then charged with a mixture composed of 13.2 g of methyl methacrylate, 13.0 g of n-butyl acrylate, 99.8 g of Lutensol TO89—20% strength, 82.29 g of Dowfax 2A1—45% strength, and 312 g of water. The stirrer was started with a rotation rate of 200 rpm, and nitrogen was passed into the reactor for a period of one minute; 9.42 g of hydroperoxide and 25% by weight of the initiator solution (b) were then added to the reactor. The polymerization time was 10 minutes. The mixture (a) and the remainder of the mixture (b) were then added during the course of 2 and, respectively, 3 hours.

| Monomer emulsion | |
|---|---|
| 160.5 g | of n-butyl acrylate |
| 283.3 g | of methyl methacrylate |
| 12.7 g | of Dowfax 2A1; 45% strength |
| 388.6 g | of demineralized water |

| Initiator solution | |
|---|---|
| 2.83 g | of ascorbic acid |
| 0.09 g | of Dissolvine E-Fe, 6.4% strength |
| 181.2 g | of water |

Once the addition of the monomer emulsion (a) had been concluded, the mixture was allowed to post-polymerize for a further hour. Cooling to room temperature followed.

The dispersion has the following properties:

| | |
|---|---|
| Solids content: | 38.2% by weight |
| Particle size: | 38.2 nm |
| pH: | 2.6 |

Example 7

Production of the Film

A doctor was used to cast a film from the material in Example 2 on smooth black paper or on a glass plate. After a drying time of 10 minutes in the ambient atmosphere, each film has a thickness of 30 μm and slight coloration underlaid by a strong white color.

Example 8

Production of the Film

On heat-treatment of Example 7 at 140° C. for a period of from 1-60 minutes the color of the film remained the same, but the gloss became much more pronounced and the underlying white color was almost entirely lost. The film has an angle-dependent color corresponding to the data in Table 2. The color of the films differed as a function of the particle size. If the direction of observation was perpendicular to the film surface the film color changed in the sequence violet, blue, green, orange, and red, these colors corresponding to the particle diameters of 226.5 nm, 240.9 nm, 281.3 nm, 294.7 nm, and, respectively, 321.1 nm. If the angle of observation was oblique (about 45°), the abovementioned color changed to bluish violet, blue, pale blue, bluish green, and, respectively, green. From this it is apparent that the film color can be varied continuously across the entire visible region of the spectrum, merely by simply selecting the correct core/envelope particle size.

Example 9

Production of the Film

If, onto the film of Example 7, an overlayer dispersion corresponding to the example is cast, and the overlayer film is dried for one hour at room temperature, or for only from 5-10 minutes at a high temperature (100° C.), the result is a glossy colored film. The film has an angle-dependent color corresponding to the data in Table 2. The color of the films changes as a function of the particle size. If the direction of observation is perpendicular to the film surface the color changed in the sequence violet, blue, green, orange, and red, these colors corresponding to the particle diameters of 226.5 nm, 240.9 nm, 281.3 nm, 294.7 nm, and, respectively, 321.1 nm. If the angle of observation is oblique (about 450) the abovementioned color changed to bluish violet, blue, pale blue, bluish green, and, respectively, green. From this it is apparent that the film color can be varied continuously across the entire visible region of the spectrum, merely by simply selecting the correct core/envelope particle size.

Example 10

Production of the Film

If, onto the film corresponding to Example 8, an overlayer dispersion corresponding to Example 6 is cast, and the overlayer film is dried for one hour at room temperature or for only from 5-10 minutes at a high temperature (100° C.), the result is a glossy colored film. The color intensity achieved is the same as that in Example 9.

Example 11

The overlayer dispersion of Example 6 is mixed with the core/shell dispersion of Example 2 in an overlayer: core/shell dispersion ratio by weight of from 5:100 to 12:100, and a film is cast on smooth black paper and dried at ambient temperature for about 10 minutes; the result is a glossy colored film. The resultant color intensity of the film is the same as that in Example 9.

Example 12

Production of the Film

A doctor was used to cast a film from the dispersion in Example 4 on smooth black paper or on a glass plate. After a drying time of 10 minutes in the ambient atmosphere, each film has a thickness of 30 μm and slight red coloration underlaid by a strong white color.

Example 13

Heat-treatment of Example 12 at 140° C. for a period of from 1-60 minutes caused no change in the color intensity obtained.

Example 14

A doctor was used to cast a film from the dispersion in Example 5 on smooth black paper or on a glass plate. After a drying time of 10 minutes in the ambient atmosphere, each film has a thickness of 30 μm and slight violet coloration underlaid by a strong white color.

Example 15

Heat-treatment of Example 14 at 140° C. for a period of from 1-60 minutes caused no change in the color intensity obtained.

Example 16

Tetraethylene glycol (TEG) or other plasticizers are mixed in an overlayer: core/envelope dispersion ratio by weight of from 5:100 to 10:100 with the core/envelope dispersion of Example 2, and a film is cast on smooth black paper and dried at ambient temperature for about 10 minutes; a glossy colored film is obtained, the color being underlaid by a strong white color.

Example 17

Tetraethylene glycol (TEG) or other plasticizers are mixed in an overlayer: core/envelope dispersion ratio by weight of from 5:100 to 20:100 with the core/envelope dispersion of Example 2, and a film is cast on smooth black paper and dried for three days at ambient temperature and humidity; the resultant film has a thickness of 100 μm and attractive gloss.

We claim:

1. A process which comprises forming a film from an aqueous emulsion of a polymer with core/shell structure, and then removing water from the aqueous film, thereby forming a polymeric film, wherein the polymeric film produces a visual effect upon reflection of electromagnetic radiation, and wherein the emulsion polymer is obtained by polymerizing monomers in at least one first stage (core monomers), then polymerizing monomers in at least one further, second stage (transition stage), and finally polymerizing monomers in a third stage which form a filmable shell (shell monomers), where, based on the percentage constitution of the monomer mixtures of the three stages, at most 30% by weight of the monomers of the first stage are identical with those of the third stage, and at least 5% by weight of the monomers of the second stage are identical with, respectively, those of the first and those of the third stage, and not more than 60% by weight of the monomers of the second stage are monomers absent in the first stage and also absent in the third stage, wherein said polymeric film comprises a matrix and discrete polymer particles distributed in the matrix, wherein the shells form the matrix and the cores form the discrete polymer particles.

2. The process as claimed in claim 1, wherein the polymer particles comprise one or more types of particle with a median particle diameter in the range from 0.05 to 5 μm, where each type of particle has a polydispersity index (PI) smaller than 0.6, calculated from the formula $$PI=(D_{90}-D_{10})/D_{50}$$

where $D_{90}$, $D_{10}$, and $D_{50}$ are particle diameters for which the following apply:

$D_{90}$: 90% by weight of the total weight of all of the particles have a particle diameter smaller than or equal to $D_{90}$ $D_{50}$: 50% by weight of the total weight of all of the particles have a particle diameter smaller than or equal to $D_{50}$ $D_{10}$: 10% by weight of the total weight of all of the particles have a particle diameter smaller than or equal to $D_{10}$.

3. The process as claimed in claim 1, wherein the polymer particles comprise one type of particle.

4. The process as claimed in claim 1, wherein the entirety of the emulsion polymer is composed of at least 40% by weight of what are known as main monomers, selected from the group consisting of $C_1$-$C_{20}$-alkyl (meth)acrylates, vinyl esters of carboxylic acids which contain up to 20 carbon atoms, vinylaromatics having up to 20 carbon atoms, ethylenically unsaturated nitriles, vinyl halides, vinyl ethers of alcohols which contain from 1 to 10 carbon atoms, aliphatic hydrocarbons having from 2 to 8 carbon atoms and one or two double bonds and mixtures of these monomers.

5. The process as claimed in claim 1, wherein the polymer particles and the matrix differ in refractive index.

6. The process as claimed in claim 5, wherein the difference in refractive index is at least 0.01.

7. The process as claimed in claim 1, wherein the polydispersity index of the discrete polymer particles is smaller than 0.45.

8. The process as claimed in claim 1, wherein the core of the emulsion polymer has been crosslinked.

9. The process as claimed in claim 1, wherein the core-to-shell weight ratio in the emulsion polymer is from 1:0.05 to 1:20.

10. The process as claimed in claim 1, wherein the distance between the discrete polymer particles of the polymeric film is from 20 to 50 000 nanometers.

11. The process as claimed in claim 1, wherein a transparent polymer layer is applied to the polymeric film.

12. The process as claimed in claim 11, wherein the entirety of the polymer of the transparent layer is composed of at least 40% by weight of what are known as main monomers, selected from the group consisting of $C_1$-$C_{20}$-alkyl (meth)acrylates, vinyl esters of carboxylic acids which contain up to 20 carbon atoms, vinylaromatics having up to 20 carbon atoms, ethylenically unsaturated nitriles, vinyl halides, vinyl ethers of alcohols which contain from 1 to 10 carbon atoms, aliphatic hydrocarbons having from 2 to 8 carbon atoms and one or two double bonds and mixtures of these monomers.

13. The process as claimed in claim 11, wherein the polymer of the transparent layer is an emulsion polymer.

14. The process as claimed in claim 13, wherein the emulsion polymer has a ponderal median particle diameter of from 10 to 500 nm.

15. The process as claimed in claim 11, wherein the polymer of the transparent layer is applied in the form of a solution or dispersion to the polymeric film, and a drying process then takes place.

16. The process as claimed in claim 11, wherein the thickness of the transparent layer is from 0.2 to 500 μm.

17. The process as claimed in claim 1, which additionally comprises heating the polymeric film to temperatures above 60° C.

18. A polymeric film, obtained by a process as claimed in claim 1.

19. The process as claimed in claim 5, wherein the difference in refractive index is at least 0.1.

20. The process as claimed in claim 13, wherein the emulsion polymer has a ponderal median particle diameter of from 30 to 200 nm.

21. A method of coating a substrate comprising coating the substrate with the polymeric film as claimed in claim 18.

22. The method as claimed in claim 21, wherein the substrate is plastic, plastic film, paper, packaging or a visual display.

23. A coated substrate wherein the coated substrate is coated by the method as claimed in claim 21.

24. The process as claimed in claim 11, which additionally comprises heating the polymeric film and the transparent polymer layer to temperatures above 60° C.

25. The process as claimed in claim 1, wherein the monomer mixture of the third stage has a glass transition temperature ($T_g$) that is lower than the $T_g$ of the monomer mixture of the first stage.

26. The process as claimed in claim 25, wherein the monomer mixture of the third stage has a $T_g$ that is lower than the $T_g$ of the monomer mixture of the first stage by at least 10° C.

27. The process as claimed in claim 25, wherein the monomer mixture of the third stage has a $T_g$ that is lower than the $T_g$ of the monomer mixture of the first stage by at least 20° C.

28. The process as claimed in claim 1, wherein none of the monomers of the first stage are identical with those of the third stage.

29. The process as claimed in claim 1, wherein at least 40% by weight of the monomers of the second stage are identical with, respectively, those of the first and those of the third stage.

30. The process as claimed in claim 1, wherein no monomers of the second stage are monomers absent in the first stage and also absent in the third stage.

31. The process as claimed in claim 1, wherein the transition stage of the emulsion polymer has been crosslinked.

* * * * *